(12) United States Patent
Gilboy et al.

(10) Patent No.: US 7,371,175 B2
(45) Date of Patent: May 13, 2008

(54) METHOD AND SYSTEM FOR ENHANCED AUDIO COMMUNICATIONS IN AN INTERACTIVE ENVIRONMENT

(75) Inventors: Christopher P. Gilboy, Freehold, NJ (US); Stephen Shinners, Freehold, NJ (US)

(73) Assignee: AT&T Corp., New York, NY (US)

( * ) Notice: Subject to any disclaimer, the term of this patent is extended or adjusted under 35 U.S.C. 154(b) by 920 days.

(21) Appl. No.: 10/341,205

(22) Filed: Jan. 13, 2003

(65) Prior Publication Data

US 2004/0138889 A1 Jul. 15, 2004

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ............................ 463/35; 463/42; 381/104
(58) Field of Classification Search .................. 709/204; 463/42, 16–22, 35, 43; 381/310, 102, 104; 700/94

See application file for complete search history.

(56) References Cited

U.S. PATENT DOCUMENTS

| | | | | |
|---|---|---|---|---|
| 4,241,235 A | * | 12/1980 | McCanney | 381/61 |
| 5,577,165 A | | 11/1996 | Takebayashi et al. | |
| 5,586,257 A | | 12/1996 | Perlman | 463/42 |
| 5,862,229 A | | 1/1999 | Shimizu | |
| 5,864,790 A | | 1/1999 | Leavy | |
| 6,152,824 A | | 11/2000 | Rothschild et al. | 463/42 |
| 6,241,612 B1 | | 6/2001 | Heredia | 463/42 |
| 6,251,011 B1 | * | 6/2001 | Yamazaki | 463/2 |
| 6,292,553 B1 | | 9/2001 | Fellingham et al. | 379/221.02 |
| 6,302,790 B1 | | 10/2001 | Brossard | 463/20 |
| 6,347,998 B1 | | 2/2002 | Yoshitomi et al. | 463/42 |
| 6,385,311 B1 | | 5/2002 | Bauer et al. | 379/201.02 |
| 6,425,825 B1 | | 7/2002 | Sitrick | 463/31 |
| 6,442,244 B1 | | 8/2002 | Fellingham et al. | 379/76 |
| 6,922,730 B1 | * | 7/2005 | Yaple | 709/231 |
| 2003/0055984 A1 | * | 3/2003 | Shimakawa et al. | 709/227 |
| 2004/0013278 A1 | * | 1/2004 | Yamada | 381/309 |

FOREIGN PATENT DOCUMENTS

| | | |
|---|---|---|
| WO | WO 00/72560 | 11/2000 |
| WO | WO 03/058518 | 7/2003 |

* cited by examiner

*Primary Examiner*—Vivian Chin
*Assistant Examiner*—Jason Kurr (57) ABSTRACT

Enhanced audio communications is provided in an interactive environment, such as a gaming environment, having multiple participants. An input audio signal, such as a speech signal, that is originated by one of the multiple participants is received. In addition, one or more instructions that correspond to the input audio signal are received. Based on the one or more instructions, an output audio signal is generated from the input audio signal. The output audio signal is designated for transmission to one or more of the participants.

33 Claims, 6 Drawing Sheets

FIG. 9

METHOD AND SYSTEM FOR ENHANCED AUDIO COMMUNICATIONS IN AN INTERACTIVE ENVIRONMENT

FIELD OF THE INVENTION

The present invention relates to communications. More particularly, the present invention relates to techniques for enhancing interactive environments providing services, such as gaming.

BACKGROUND OF THE INVENTION

On-line multiplayer gaming is a growing consumer market that is projected to expand as broadband access becomes more pervasive in households. The allure of on-line gaming is the availability of games on demand and the ability to match up against opponents from all over the globe.

Many on-line game providers sponsor on-line game servers that allow players to log in and join games at any time. For example, players may participate in games involving sports, warfare, adventure, and science fiction themes. Such servers give providers the ability to promote their games and products.

One disadvantage of current on-line gaming environments is that player to player communications, such as audio and voice communications, are limited. Furthermore, any voice communications in such environments do not provide much realism associated with gaming environments that model, for example, sounds associated with dynamically changing physical environments.

Accordingly, what is needed are techniques for providing enhanced and more realistic voice and audio communications in interactive environments.

SUMMARY OF THE INVENTION

The present invention is directed to a method of providing enhanced audio communications in an interactive environment, such as a gaming environment, having multiple participants. The method receives an input audio signal, such as a speech signal, originated by one of the multiple participants. The method also receives one or more instructions that correspond to the input audio signal. Based on the one or more instructions, the method generates an output audio signal from the input audio signal. The output audio signal is designated for transmission to one or more of the participants.

In generating the output audio signal, the method may set a magnitude of the input audio signal. This magnitude may be based, for example, on a location of the participant that originated the input audio signal within a virtual space of the interactive environment. The magnitude may also be set so that the output audio signal will be audible to the corresponding one or more participants when they are within a predetermined virtual space of the interactive environment.

In a further aspect, the magnitude may be set according to a distance in a virtual space of the interactive environment between the one or more participants corresponding to the output audio signal and the participant that originated the input audio signal.

In yet a further aspect, the magnitude may be set according to achievements in the interactive environment of one or more of the plurality of participants. Such achievements may include credits (e.g., scoring points) earned in the interactive environment.

The method may also include combining (e.g., summing) the input audio signal with one or more other audio signals. These other audio signals may be originated by other audio signals and be processed according to techniques similar to those performed on the input audio signal.

Also, the method may alter the input audio signal by performing, for example, operations that assimilate a speech signal to resemble the voice of a character associated with the interactive environment. In further aspects, the method may monitor the input audio signal for the presence of information, such as one or more predetermined words. Upon detection of these word(s), the method may update the interactive environment accordingly.

The input audio signal and/or the one or more instructions may be received from a server. Also, the method may include sending the output audio signal to a server for transmission to the corresponding one or more participants.

The present invention is also directed to a system for providing enhanced audio communications in an interactive environment (such as a gaming environment) having multiple participants. The system includes a server and an audio bridge. The server receives an input audio signal (e.g., a speech signal) from a participant, and sends an output audio signal to one or more of the multiple participants. The audio bridge generates the output audio signal from the input audio signal.

The audio bridge may set a magnitude for the input audio signal. This magnitude may be based on a location of the participant that originated the input audio signal within a virtual space of the interactive environment. The audio bridge may also set the magnitude so that the output audio signal will be audible to the corresponding one or more participants when they are within a predetermined virtual space of the interactive environment.

In further aspects of the present invention, the audio bridge may set the magnitude according to a distance in a virtual space of the interactive environment between the one or more participants corresponding to the output audio signal and the participant that originated the input audio signal.

In yet a further aspect, the audio bridge may set the magnitude according to achievements in the interactive environment of one or more of the plurality of participants. Such achievements may include credits (e.g., scoring points) earned in the interactive environment.

Also, the audio bridge may alter the input audio signal by performing, for example, operations that assimilate a speech signal to resemble the voice of a character associated with the interactive environment.

In further aspects, the audio bridge may monitor the input audio signal for the presence of information, such as one or more predetermined words. Upon detection of these word(s), the server may update the interactive environment accordingly.

The audio bridge may also combine the input audio signal with one or more other audio signals. In addition, the audio bridge may alter one or more characteristics of the input audio signal.

The system may also include a signal converter that converts between a compressed audio signal format supported by the server, and an uncompressed audio signal format supported by the audio bridge. A local area network (LAN) may couple the server, the signal converter, and the audio bridge.

The present invention advantageously provides for realistic audio in interactive environments. In addition, embodiments of the present invention allow for an efficient distribution of processing loads. Further features and advantages of the present invention will become apparent from the following description and drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Exemplary Operational Environment

Figure 1:
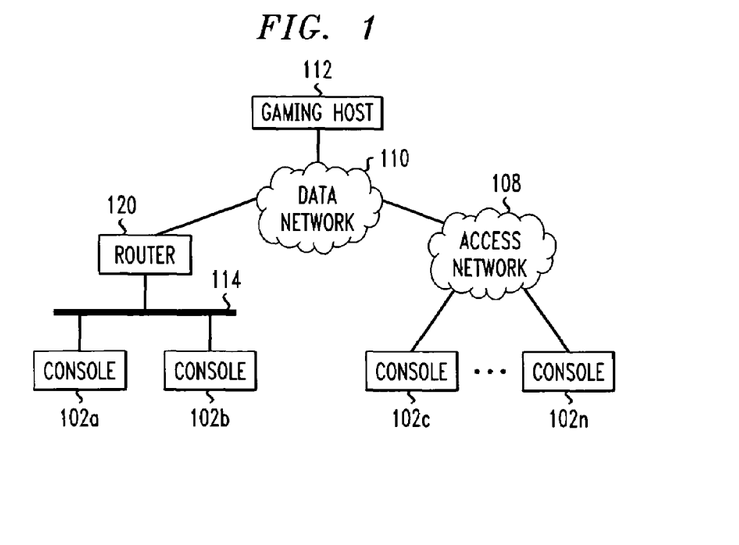
FIG. 1 is a block diagram of an exemplary operational environment.

Before describing the invention in detail, it is helpful to first discuss an environment in which the invention may be used. Accordingly, FIG. 1 is a block diagram of an exemplary operational environment. In this environment, a plurality of gaming consoles 102 participate in an interactive gaming environment provided by gaming host 112. To participate in this gaming environment, consoles 102 communicate with gaming host 112 across various communications resources.

In particular, FIG. 1 shows that gaming host 112 is connected to a data network 110, such as the Internet. Gaming consoles 102a and 102b are each coupled to a local area network (LAN) 114, such as an Ethernet. A router 120 that is also coupled to LAN 114 provides consoles 102a and 102b with access to data network 110. Gaming consoles 102c through 102n each connect to data network 110 through an access network 108, such as a cable network or a digital subscriber line (DSL) network.

In providing the interactive gaming environment, gaming host 112 performs several functions. For instance, gaming host 112 maintains gaming state information, which may be affected by the actions of participants at consoles 102. In addition, gaming host 112 manages information, such as participant scoring data, as well as other information associated with the participants and the gaming environment.

Moreover, gaming host 112 handles communications with each console 102. Such communications involve receiving information from participants, such as playing instructions and audio (e.g., voice) signals. Such communications also involve sending information to each of consoles 102. Such information may include current environment state information that allows each console 102 to output gaming information, such as graphics and audio signals, to a participant. However, gaming host 112 may not necessarily transmit the same information to each gaming console 102. For instance, each console 102 may receive different audio signals. The transmission of different audio signals may be performed in accordance with the techniques described herein.

Figure 2:
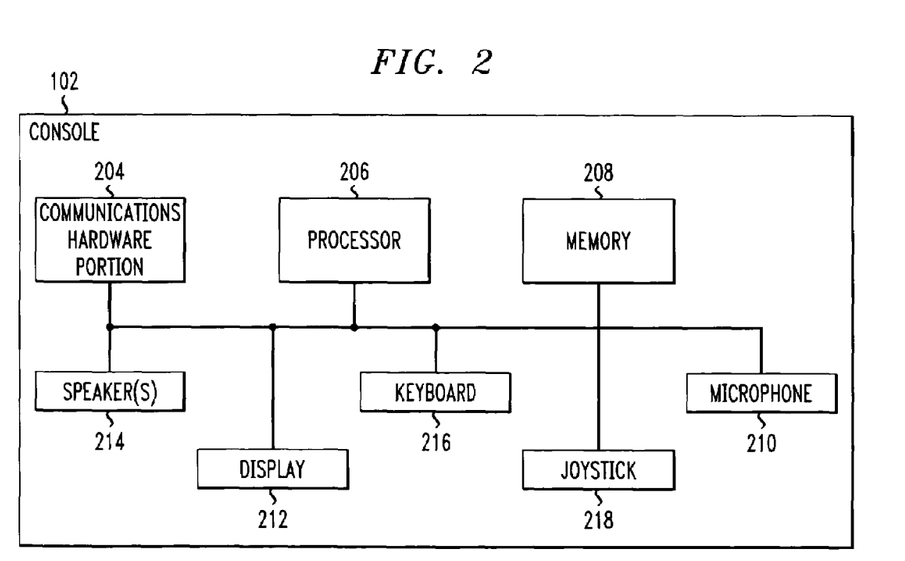
FIG. 2 is a diagram of a gaming console implementation.

FIG. 2 is a diagram showing an implementation of an exemplary gaming console 102. As shown in FIG. 2, the gaming console implementation includes a communications hardware portion 204, a processor 206, a memory 208, and various input and output devices.

Communications hardware portion 204 may include a modem, such as a dial-up modem for connecting to a telephony network or a cable modem for connecting to a cable network (e.g., a data over cable service interface specification (DOCSIS) network). Alternatively, communications hardware portion 204 may include a network interface card (NIC) for connecting to a LAN.

For audio signals, a participant may input voice signals through a microphone 210. The participant may receive audio signals from gaming host 112 through one or more speakers 214. The participant may view visual information associated with the gaming environment through a display 212. To generate commands and instructions for gaming host 112, the participant may use various input devices. For example, FIG. 2 shows a keyboard 216 and a joystick 218.

The gaming console of FIG. 2 may be implemented with a personal computer. Alternatively, the gaming console may be implemented with commercially available gaming products. Examples of such products include the Xbox manufactured by Microsoft Corporation of Redmond, Washington, the GameCube manufactured by Nintendo of America Inc. of Redmond, Wash., and the Playstation 2 manufactured by Sony Computer Entertainment Inc.

II. Interactive Environment

Figure 3:
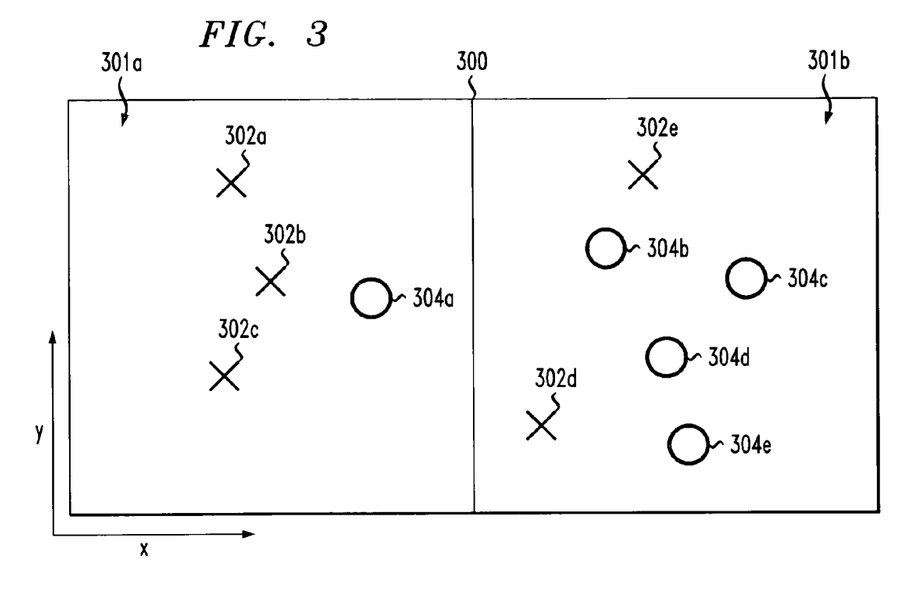
FIG. 3 is a diagram of an exemplary interactive gaming environment.

FIG. 3 is a diagram of an exemplary interactive gaming environment. This environment includes a virtual space 300 having subspaces 301a and 301b. Virtual space 300 represents a physical area, such as a sports playing field, a battlefield, or a building. Subspaces 301 represent portions of virtual space 300. For example, subspaces 301 may represent zones or regions on a playing field, occupied territories on a battlefield, or rooms in a building.

As shown in FIG. 3, the interactive environment includes participants 302a-e and 304a-e. In this environment, participants 302 belong to a first team, and participants 304 belong to a second team. Each of these participants has a position within virtual space 300. This position is based on a coordinate system, such as the rectangular (i.e., x-y) coordinate system shown in FIG. 3. From this coordinate system, distances between objects may be determined.

The environment of FIG. 3 is dynamic. Therefore, the positions of participants 302 and 304 may change over time. In addition, the characteristics of virtual spaces 300 and 301a-b may also change in time. Such changes may involve the size, shape and orientation of these spaces. Although FIG. 3, is a diagram of a two-dimensional physical space, virtual environments may represent other dimensional (e.g., 3-D) spaces.

III. Gaming Host

Figure 4:
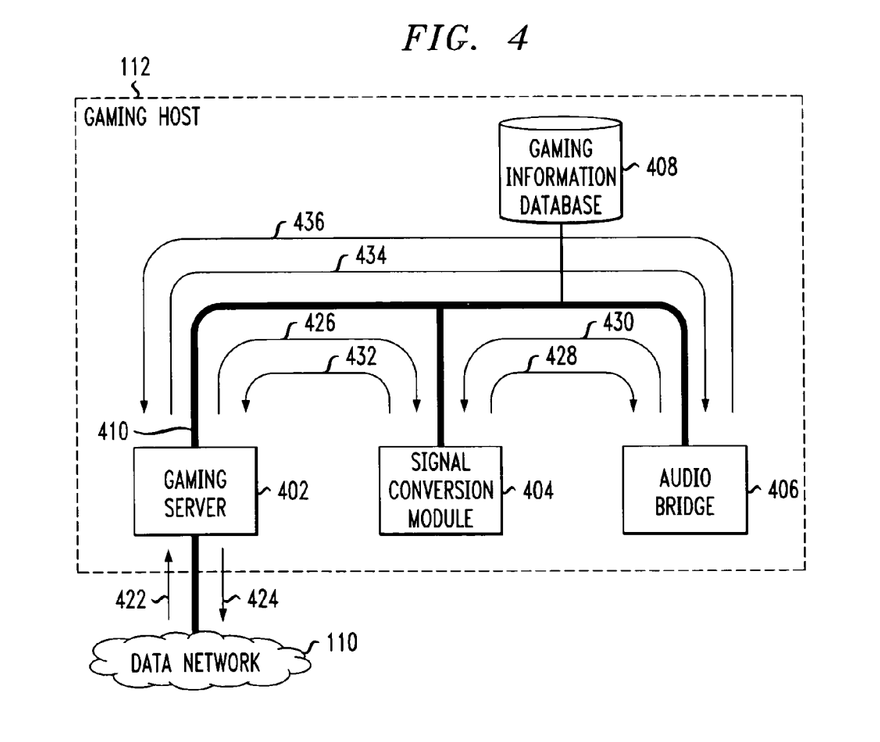
FIG. 4 is a block diagram of a gaming host implementation.

FIG. 4 is a block diagram of a gaming host 112 implementation. As shown in FIG. 4, gaming host 112 includes a gaming server 402, a signal conversion module 404, and an audio bridge 406. In addition, gaming host 112 includes an optional gaming information database 408. These elements are coupled through a communications infrastructure 410, such as a high-speed Ethernet local area network (LAN) or a computer system bus interface.

Gaming server 402 manages various attributes of the interactive gaming environment. These attributes include rules associated with the gaming environment, individual participant information, and gaming environment state information. Such state information includes scoring data, and spatial parameters associated with virtual spaces and objects: within the interactive environment. These spatial parameters may include positions of participants, and distances between participants. As described above with reference to FIG. 3, these attributes may be dynamic.

FIG. 4 shows that gaming server 402 is directly coupled to data network 110. Thus, gaming server 402 is responsible for handling the exchange of information with each console 102. In particular, gaming server 402 receives upstream communications 422 in the form of instructions and/or audio signals from gaming consoles 102. Gaming server 402 processes these upstream communications and updates state information associated with the gaming environment. In addition, gaming server 402 may generate and transmit responses 424 to consoles 102. These responses include content, such as display information, scoring information, and text messages. Additionally, these responses may include audio signals generated by audio bridge 406 according to techniques, such as the ones described herein.

The exchange of upstream communications 422 and responses 424 may be in accordance with one or more protocols, such as the Internet Protocol (IP) and/or the real-time protocol (RTP). Additionally, to maintain synchronization between gaming participants, gaming server 402 may regulate the precise times at which information is transmitted to each of consoles 102.

The audio signals that gaming server 402 exchanges with consoles 102 may be in various formats. For example, these audio signals may be compressed to efficiently utilize bandwidth provided by data network 110. For example, algorithms, such as G.723 and G.723.1, as defined by the International Telecommunication Union (ITU) may be employed to compress these audio signals. These algorithms provide for bit rates of 6.3 and 5.4 kbps and use linear predicitive encoding and dictionaries to help provide smoothing.

Gaming server 402 forwards -the audio signals received from consoles 102 to audio bridge 406 for processing. In turn, audio bridge 406 returns processed audio signals to gaming server 402 for distribution to consoles 102. Unlike the compressed signals exchanged with consoles 102, audio bridge 406 handles uncompressed waveform-encoded audio signals. For example, audio bridge may handle audio signals encoded according to the ITU G.711 algorithm. This algorithm provides for the transmission of pulse code modulated (PCM) voice signals at digital bit rates of 48, 56, and 64 Kbps.

To convert between compressed and uncompressed formats, signal conversion module 404 operates as an interface between gaming server 402 and audio bridge 406. Thus, module 404 converts compressed audio signals 426 received from gaming server 402 into uncompressed waveform-encoded signals 428 that are sent to audio bridge 406. Conversely, module 404 converts uncompressed audio signals 430 received from audio bridge 406 into compressed signals 432 that are sent to gaming server 402 for distribution to consoles 102.

Audio bridge 406 generates output audio signals 430 according to instructions 434 received from gaming server 402. In addition to generating audio signals 430, audio bridge 406 may perform speech recognition operations on audio signals 428. These operations involve detecting whether certain words and phrases are present in audio signals 428.

As shown in FIG. 4, audio bridge 406 receives instructions 434 from gaming server 402. Instructions 434 direct the manner in which audio bridge 406 processes audio signals 428. In addition, instructions 434 may indicate words and phrases to be detected by speech recognition technology. FIG. 4 also shows that audio bridge 406 sends responses 436 to gaming server 402. These responses may convey various types of information. For instance, responses 436 may report the identification of certain words and phrases in audio signals 428. Upon receipt of such information, gaming server 402 may update the interactive gaming environment accordingly.

Audio bridge 406 may advantageously remove certain processing loads from gaming server 402. For example, embodiments of the present invention allow processing loads associated with audio (e.g., speech) signal processing to be transferred from gaming server 402 to audio bridge 406. Accordingly, in embodiments of the present invention, audio bridge 406 may be implemented as a computer system (such as the exemplary computer system described below with reference to FIG. 9) that employs one or more digital signal processors (DSPs) to provide efficient signal processing operations.

FIG. 4 shows that gaming host 112 may include an optional gaming information database 408. Database 408 may store information, such participant account information. This account information may include passwords and security information that gaming server 402 utilizes when a participant requests to join.

IV. Audio Bridge

Figure 5:
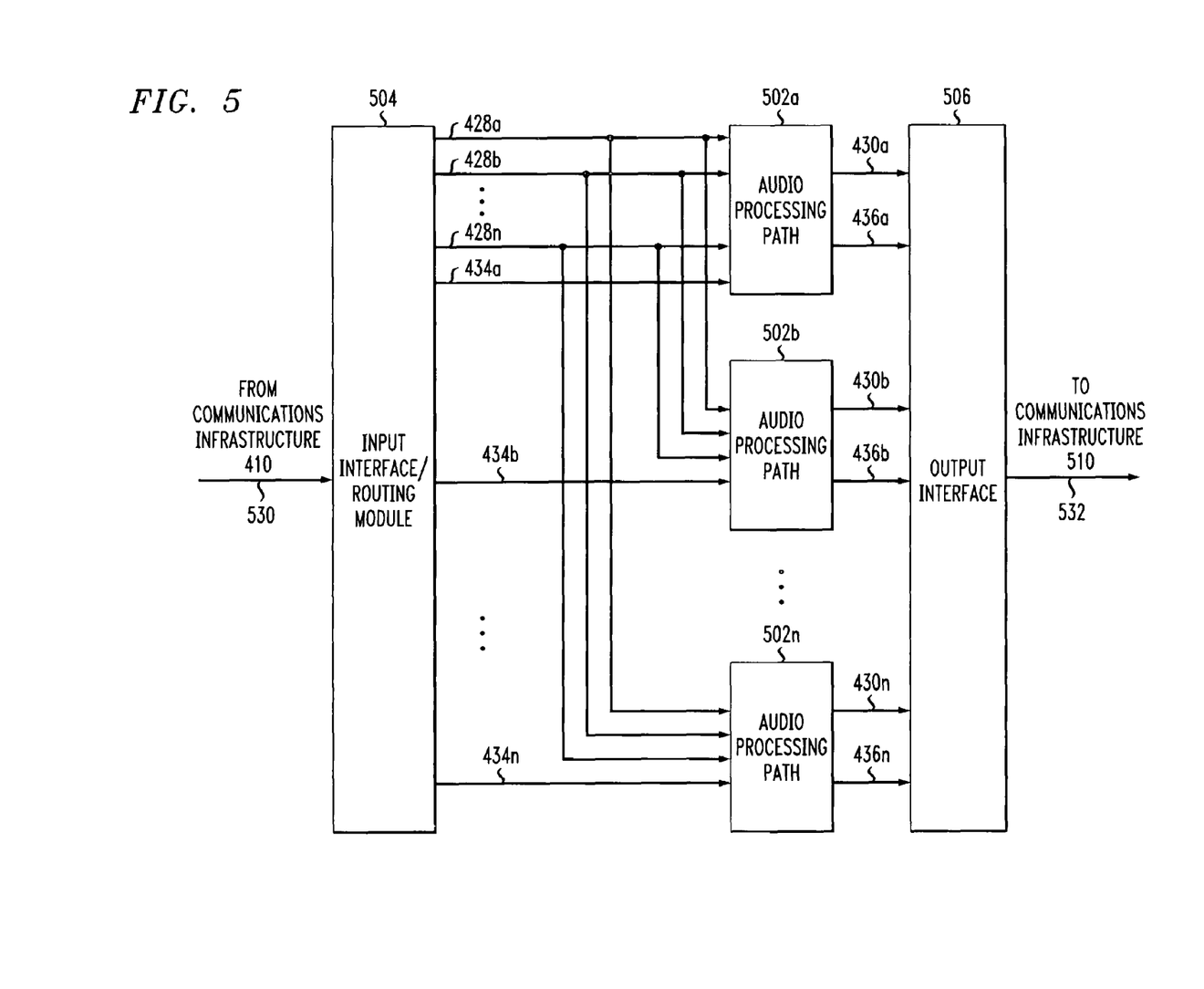
FIG. 5 is a block diagram of an audio bridge implementation.

An implementation of audio bridge 406 is shown FIG. 5. This implementation includes a plurality of audio processing paths 502, an input interface 504, and an output interface 506. FIG. 5 shows that input interface 504 receives transmissions 530 from gaming server 402. These transmissions include instructions 434 and audio signals 428.

Input interface 504 also includes routing capabilities. These capabilities enable input interface 504 to forward signals and instructions to the appropriate audio processing path(s) 502. For instance, FIG. 5 shows that input interface 504 forwards audio signals 428a-428n to each of audio processing paths 502a-n. Also, FIG. 5 shows that input interface 504 forwards instructions 434a to audio processing path 502a, instructions 434b to audio processing path 502b, and instructions 434n to audio processing path 502n.

FIG. 5 shows that audio bridge 406 includes n processing paths 502. Each of these processing paths corresponds to a group of one or more recipient consoles 102. Accordingly, each processing path 502 generates an output audio signal 430 that is designated for transmission by gaming server 402 to the corresponding recipient console(s) 102. The generation of output audio signals 430 may involve various processes. For example, these processes may include scaling operations and signal mixing operations. The manner in which such operations are performed is determined by instructions 434.

In addition, each processing path 502 may perform operations to alter the characteristics of individual audio signals. These operations may include the addition of various effects such as reverberation, pitch alteration, and character assimilation. Character assimilation involves changing the properties of speech signals so that they sound as if another person, such as a fictional game character, uttered them.

Moreover, each processing path 502 may monitor signals 428 for certain information. For example, each processing path 520 may employ speech recognition techniques to detect predetermined words and phrases. As described above, gaming server 402 may transmit these predetermined words and phrases to audio bridge 406 in the form of instructions 434.

As shown in FIG. 5, each processing path 502 may generate responses 436 that are sent to output interface 506 for transmission to gaming server 402. Responses 436 may convey various forms of information to gaming server 402. For instance, responses 436 may convey the detection of words and phrases indicated by instructions 434.

Output interface 506 receives audio signals 430 and responses 436, and formats them into transmissions 532 that are sent across communications infrastructure 410. In embodiments where communications infrastructure 410 is an Ethernet LAN, transmissions 532 include one or more Ethernet packets.

Figure 6:
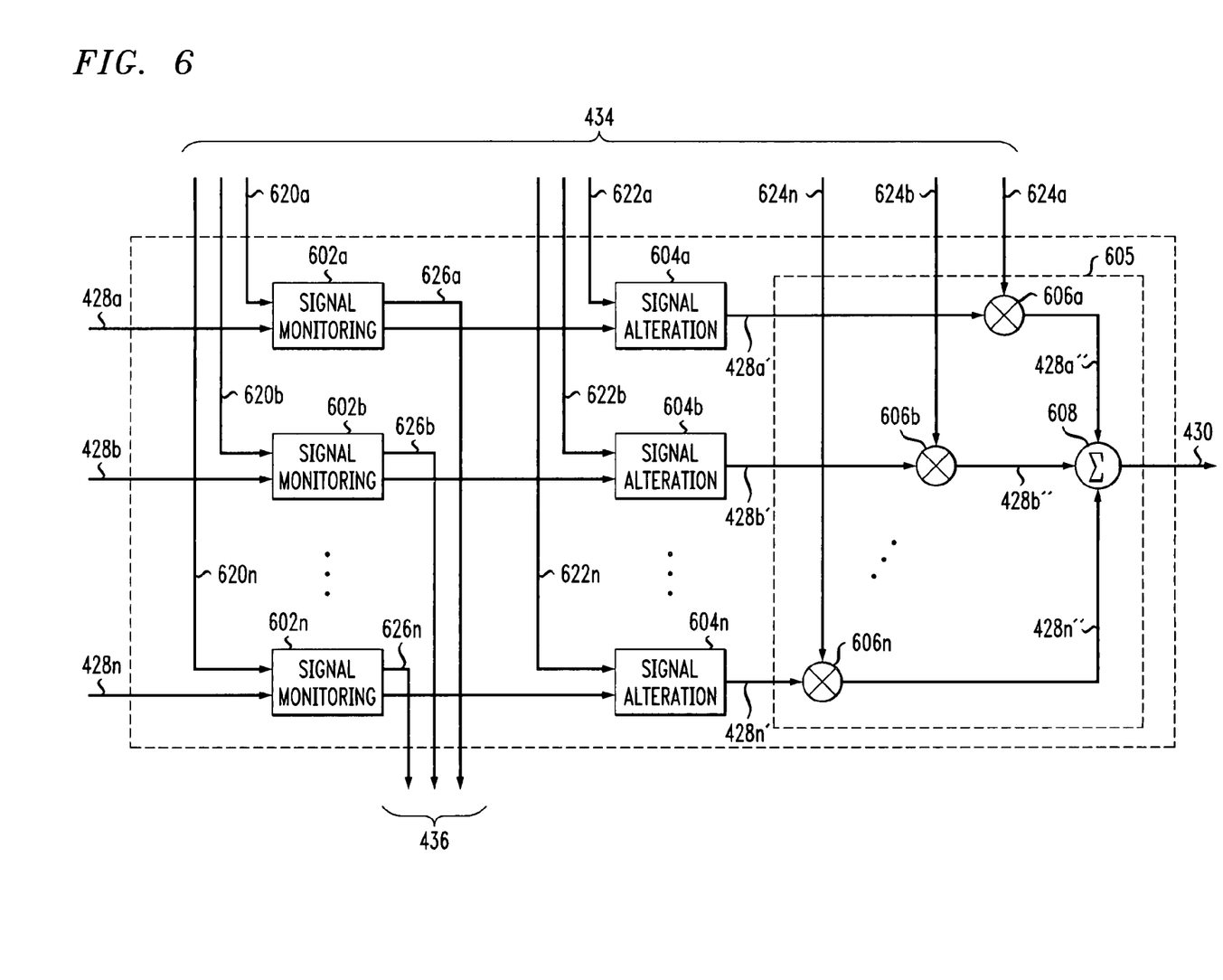
FIG. 6 is a block diagram of an audio processing path.

FIG. 6 is a block diagram showing an implementation of an audio processing path 502. FIG. 6 shows that, for each input audio signal 428, the audio processing path implementation includes a signal monitoring module 602, and a signal alteration module 604. FIG. 6 also shows that the audio processing path implementation includes a signal mixing portion 605.

In addition, FIG. 6 shows that instructions 434 include various messages generated by gaming server 402. These messages are sent to different elements within audio processing path 502. These messages include signal monitoring keywords 620 that are sent to signal monitoring modules 602, signal alteration commands 622 that are sent to signal alteration modules 604, and scaling coefficients 624 that are sent to signal mixing portion 605.

Each signal monitoring module 602 employs speech recognition technology to identify words and/or phrases in received audio signals 428. These words and/or phrases are provided by content server 402 as signal monitoring keywords 620. When a signal monitoring module 602 detects the presence of any such words and/or phrases, it generates a detection message 626 to be sent to gaming server 402 as a response 436. Detection messages 626 may indicate the words and/or phrases detected, the identity of the audio signal 428 containing the words and/or phrases, and the time of the detection.

Each signal alteration module 604 generates an audio signal 428' from a received audio signal 428. In generating these signals, each module 604 may alter the characteristics of the received audio signal 428. For example, signal alteration modules 604 may add effects, such as reverberation, pitch alteration, and character assimilation. To perform these functions, signal alteration module 604 may perform various digital signal processing operations and algorithms. Each module 604 performs such operations in response to commands 622 received from gaming server 402. Accordingly, such signal alteration operations are optional.

Signal mixing portion 605 receives audio signals 428' (potentially altered by signal alteration modules 604) and mixes these signals to produce an output audio signal 430. Signal mixing portion 605 may be implemented using digital signal processing techniques. Accordingly, a signal flow representation of such an implementation is provided in FIG. 6. This implementation includes a plurality of scaling nodes 606, and a combining node 608. Each scaling node 606 multiplies an audio signal 428 (either altered or unaltered) with a corresponding scaling coefficient 624 that is provided by gaming server 402. As shown in FIG. 6, each multiplication results in a scaled audio signal 428", which is sent to combining node 608.

Combining node 608 receives signals 428" and combines (e.g., adds) them to produce an output audio signal 430. As described above with reference to FIG. 5, the output audio signal 430 is sent to output interface 506, where it is formatted for transmission across communications infrastructure 410.

V. Operation

Figure 7:
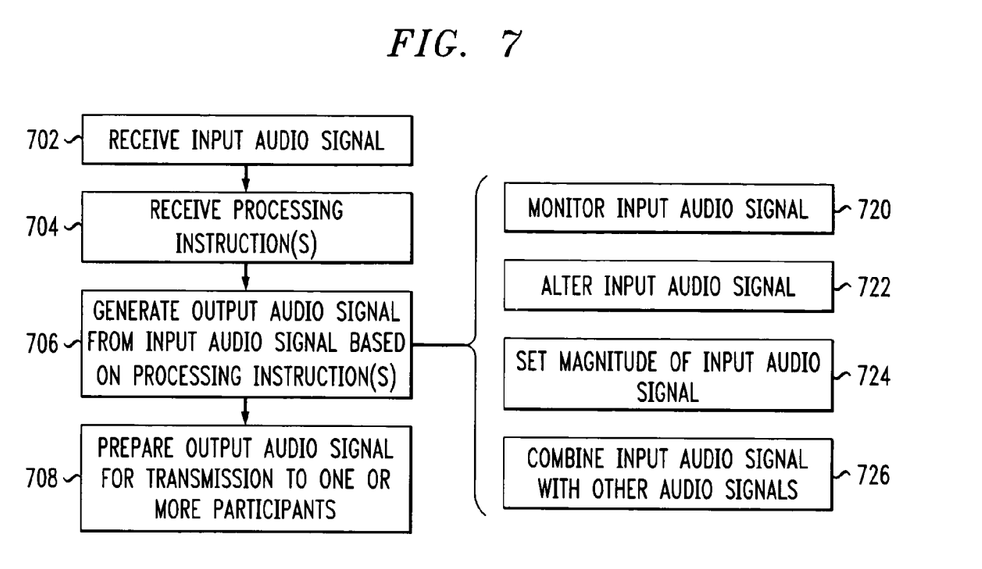
FIGS. 7 and 8 are flowcharts illustrating operational sequences of the present invention.

FIG. 7 is a flowchart illustrating an operational sequence according to the present invention. This sequence may be employed in an interactive environment, such as the interactive gaming environment of FIG. 3. This operational sequence is described with reference to the gaming host implementation described above with reference to FIGS. 4 through 6. However, this sequence may be employed in other contexts.

The sequence of FIG. 7 demonstrates techniques of the present invention that advantageously allow audio signals to be dynamically controlled based on real-time conditions of an interactive environment. As a result, the interactive environment provides participants with enhanced audio communications.

As shown in FIG. 7, this sequence includes a step 702. In this step, an input audio signal is received. This signal is originated by one of a plurality of participants, such as the participants operating gaming consoles 102. Accordingly, the input audio signal may be a speech signal uttered by the participant. In the context of FIG. 4, this step includes audio bridge 406 receiving an input audio signal 428 from gaming server 402.

In a step 704, one or more processing instructions are received. In the context of FIG. 4, this step includes audio bridge 406 receiving instructions from gaming server 402. These instructions correspond to the input audio signal, and may be based on the current state of the interactive environment provided by gaming server 402. In the context of FIG. 4, this step comprises audio bridge 406 receiving one or more instructions 434 from gaming server 402.

In a step 706, an output audio signal is generated from the input audio signal. This generation is based on the one or more instructions received in step 704. The output audio signal generated in step 706 is designated for transmission to one or more of the participants in the interactive environment (referred to herein as designated recipient(s)). In the context of FIG. 4, this step comprises audio bridge 406 generating an output audio signal 430 from input audio signal 428. As shown in FIG. 7, step 706 may include various optional steps that are described below.

In a step 708, the output audio signal generated in step 706 is prepared for transmission to the corresponding one or more participants. For instance, in this step, audio bridge 406 may deliver output audio signal 430 to gaming server 402 for transmission to consoles 102.

Step 706 may include various optional steps. Any combination of such optional steps may be performed concurrently or in various sequential orders. As examples, FIG. 7 illustrates optional steps 720, 722, 724, and 726.

In optional step 720, the input signal is monitored for information. Accordingly, step 720 may comprise the employment of speech recognition technology to recognize certain words and/or phrases. In the context of FIG. 4, these words and/or phrases (i.e., multiple words) may be provided by gaming server 402 through one or more instructions 434. If certain information (such as provided words and/or phrases) are detected, then step 720 may include providing an indication of such detection. In the context of FIG. 4, such indications may be in the form of responses 436.

Such indications may affect the interactive environment. Accordingly, an interactive gaming environment may be affected by the detection of certain words and/or phrases. This feature may be employed in gaming environments involving themes such as fantasy and science fiction. In such environments, a participant may enter a virtual space that represents, for example, a castle. When this occurs, input signals originated by the participant are monitored for one or more phrases, such as "come out dragon."

If this phrase is detected, an indication is provided and the gaming environment reacts to the occurrence of this phrase. This reaction may include a dragon entering the virtual space. In the context of FIG. 4, such gaming environment reactions are performed by gaming server 402.

Such reactions may require other conditions to also occur. For instance, with reference to the environment of FIG. 1, the participant may need to make other forms of input that is concurrent with the uttering of such phrases. Such other forms of input may include the pressing of certain keyboard keys on its console 102.

In optional step 722, the input signal is altered. Accordingly, this step may include the addition of various effects to the input audio signal. Examples of such effects include reverberation, pitch alteration, and character assimilation. For instance, in an interactive gaming environment, voice signals originated by a gaming participant may be altered based on the location of the originating participant within a virtual space. For example, effects such as reverberation may be added when the originating participant is in a space that represents (i.e., models), for example, a cave.

In step 724, a magnitude of the input audio signal is set. This magnitude may be set according to various factors. One factor is the location of the participant that originated the input audio signal within a virtual space of the interactive environment. For example, the magnitude of the input audio signal may be set so that the output audio signal will be audible to the corresponding one or more participants when they are within a predetermined virtual space of the interactive environment. This predetermined space may be the virtual space that the participant who originated the input audio signal is within.

An example of this technique is provided with reference to the environment of FIG. 3. In this example, participant 302a originates an input audio signal and participant 304b is a designated recipient. When virtual space 300 is the predetermined space, the magnitude of the audio signal is set in step 724 so that the generated output signal will be audible to participant 304b. However, when the virtual space is subspace 301a, the magnitude of the audio signal is set in step 724 so that the generated output signal will not be audible to participant 304b. To make this signal inaudible, its magnitude may be set to zero.

Another factor for setting a magnitude of the input audio signal in step 724 is the distance in a virtual space between the designated recipient(s) and the participant that originated the input audio signal. For instance, as this distance increases, the signal magnitude decreases. Likewise, as this distance decreases, the signal magnitude decreases.

An example of this distance-based technique is provided with reference to the environment of FIG. 3. In this example, participant 302a originates an input audio signal. When participant 302b is a designated recipient, the magnitude of the audio signal is set in step 724 to a first level. However, when participant 304b is the designated recipient, the: magnitude of the audio signal is set in step 724 to a second level that is less than the first level.

A further factor for setting a magnitude of the input audio signal in step 724 is whether the designated recipient is within a predetermined group of participants. Such predetermined groups may be based, for example, on team membership. For instance, in the environment of FIG. 3, when participants 304a-e are designated recipients, the magnitude of a signal originated by participant 304a will be set in step 724 to be audible. However, the magnitude of a signal originated by participant 302a will be set in step 724 to be inaudible.

Input audio signal magnitudes may also be set in step 724 according to the achievements in the interactive environment of one or more participants, such as the designated recipient(s). Such achievements may be attained, for example, through earning a predetermined number of game points, rewards, or credits.

As an example, this feature may implemented in an interactive environment that provides an on-line football game. In this example, each player (i.e., participant) in a team's huddle may originate input audio (e.g., speech) signals. These input signals each have one or more corresponding designated recipients on the opposing team. If the designated recipient(s) have accumulated a predetermined number of credits (e.g., scoring points, yards, number of receptions, etc.), then the magnitude of such input audio signals may be set so that they are audible to the designated recipients.

In the audio processing path implementation described above with reference to FIG. 6, such magnitudes are set by scaling nodes 606. As described above, scaling nodes 606 scale audio signals 626 according to scaling coefficients 624 that are received from gaming server 402. Thus, to implement magnitude setting features of the present invention, gaming server 402 may determine scaling coefficients 624 according to characteristics of the interactive environment.

In optional step 726, the input audio signal is combined (e.g., summed) with one or more other audio signals. These other audio signals may also be originated by participants in the interactive environment. Thus, they may also be processed in similar ways as the input audio signal. With reference to the audio processing path implementation of FIG. 6, such combining is performed by combining node 608.

Figure 8:
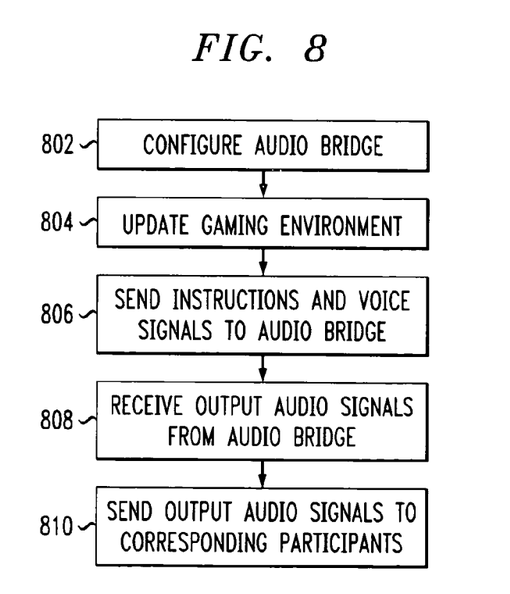

FIG. 8 is a flowchart of an exemplary operational sequence performed by gaming server 402. This sequence includes a step 802, in which gaming server 402 configures audio bridge 406. This step may include establishing the number of audio processing paths 502, and the designated recipients and originating participant(s) for each audio processing path 502. In the context of a gaming environment, this step may be performed at the beginning of a game or at any time when the participants in the game change.

In a step 804, gaming server 402 updates the gaming environment. This step includes processing according to gaming software that it is executing, as well as actions by each participant. As a result of this processing, environment characteristics, such as spatial parameters and scoring data may change.

In a step 806, gaming server 402 sends instructions 434 and audio signals 426 to audio bridge 406. As described above, these instructions may be sent to audio bridge 406 directly, while these audio signals may be sent via conversion module 404.

In step 808, gaming server 402 receives output audio signals 432. These output audio signals may be processed according to the techniques described above. For instance, these output audio signals may be received via conversion module 404. In step 810 the output audio signals are transmitted to one or more corresponding participants. These transmitted signals may be compressed to conserve communications bandwidth.

In embodiments of the present invention, the steps of FIG. 8 may each be performed continuously. In addition, other steps may be included.

VI. Computer System

Figure 9:
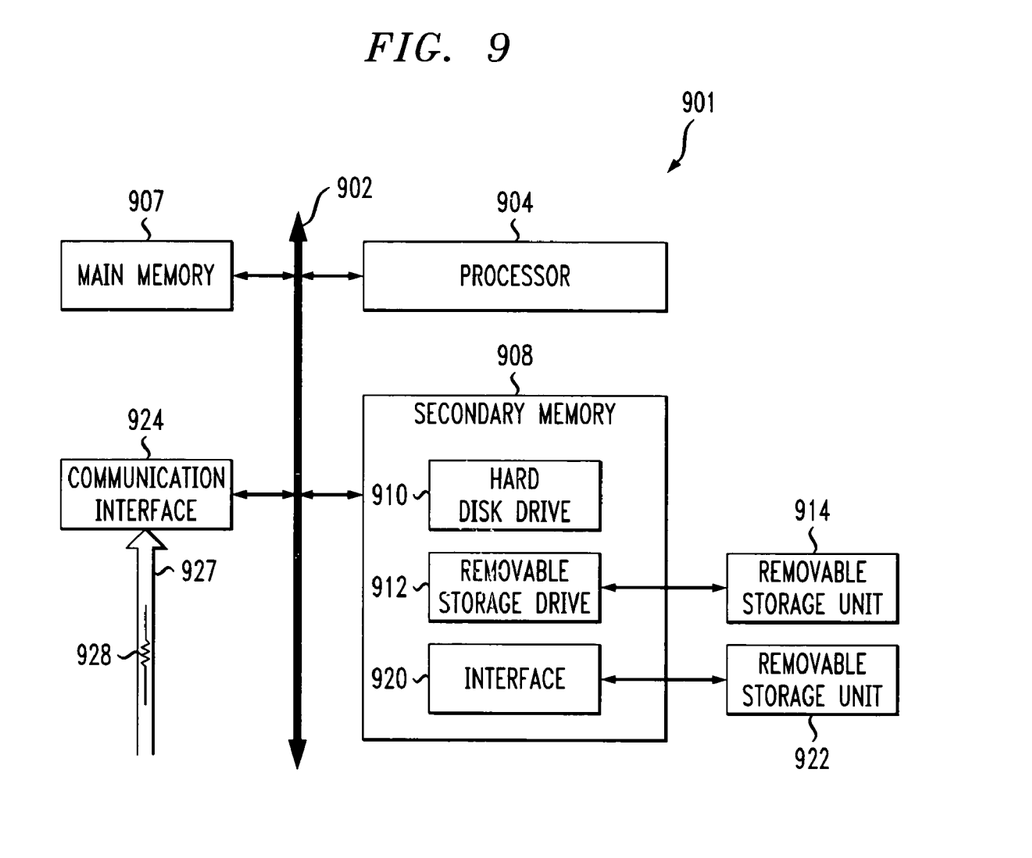
FIG. 9 is a block diagram of a computer system implementation.

As described above, various elements may be implemented with one or more computer systems. These elements include gaming server 402, signal conversion module 404, audio bridge 406, and consoles 102. An example of a computer system 901 is shown in FIG. 9.

Computer system 901 represents any single or multi-processor computer. Single-threaded and multi-threaded computers can be used. Unified or distributed memory systems can be used. Computer system 901 includes one or more processors, such as processor 904. These processor(s) may be, for example, commercially available general purpose processors or special purpose (e.g., digital signal processing) processors. One or more processors 904 can execute software implementing the processes described above. Each processor 904 is connected to a communication infrastructure 902 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 901 also includes a main memory 907, which is preferably random access memory (RAM). Computer system 901 may also include a secondary memory 908. Secondary memory 908 may include, for example, a hard disk drive 910 and/or a removable storage drive 912, representing a floppy disk drive, a magnetic tape drive, an optical disk drive, etc. Removable storage drive 912 reads from and/or writes to a removable storage unit 914 in a well known manner. Removable storage unit 914 represents a floppy disk, magnetic tape, optical disk, etc., which is read by and written to by removable storage drive 912. As will be appreciated, the removable storage unit 914 includes a computer usable storage medium having stored therein computer software and/or data.

In alternative embodiments, secondary memory 908 may include other similar means for allowing computer programs or other instructions to be loaded into computer system 901. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 901.

Computer system 901 may also include a communications interface 924. Communications interface 924 allows software and data to be transferred between computer system 901 and external devices via communications path 927. Examples of communications interface 927 include a modem, a network interface (such as Ethernet card), a communications port, etc. Software and data transferred via communications interface 927 are in the form of signals 928 which can be electronic, electromagnetic, optical or other signals capable of being received by communications interface 924, via communications path 927. Note that communications interface 924 provides a means by which computer system 901 can interface to a network such as the Internet.

The present invention can be implemented using software running (that is, executing) in an environment similar to that described above with respect to FIG. 9. In this document, the term "computer program product" is used to generally refer to removable storage units 914 and 922, a hard disk installed in hard disk drive 910, or a signal carrying software over a communication path 927 (wireless link or cable) to communication interface 924. A computer useable medium can include magnetic media, optical media, or other recordable media, or media that transmits a carrier wave or other signal. These computer program products are means for providing software to computer system 901.

Computer programs (also called computer control logic) are stored in main memory 907 and/or secondary memory 908. Computer programs can also be received via communications interface 924. Such computer programs, when executed, enable the computer system 901 to perform the features of the present invention as discussed herein. In particular, the computer programs, when executed, enable the processor 904 to perform the features of the present invention. Accordingly, such computer programs represent controllers of the computer system 901.

The present invention can be implemented as control logic in software, firmware, hardware or any combination thereof. In an embodiment where the invention is implemented using software, the software may be stored in a computer program product and loaded into. computer system 901 using removable storage drive 912, hard drive 910, or interface 920. Alternatively, the computer program product may be downloaded to computer system 901 over communications path 927. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

VII. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. For example, the present invention may be employed in interactive environments that do not involve gaming.

Thus, the breadth and scope of the present invention should not be limited by any of the above-described exemplary embodiments, but should be defined only in accordance with the following claims and their equivalents.

What is claimed is:

1. A method of providing enhanced audio communications in an interactive environment having a plurality of participants, the method comprising:

(a) receiving an input audio signal originated by one of the plurality of participants;
(b) receiving information associated with points scored by the one of the plurality of participants; and
(c) based on the information, generating an output audio signal from the input audio signal, wherein a magnitude of the output audio signal is based at least in part on the points scored in the interactive environment by the one of the plurality of participants.

2. The method of claim 1, wherein step (c) comprises the step of setting a magnitude of the audio signal.

3. The method of claim 2, wherein said setting step comprises setting the magnitude based on a location of an entity within a virtual spaced of the interactive environment, the entity being controlled by the participant that originated the input audio signal.

4. The method of claim 2, wherein said setting step comprises setting the magnitude so that the output audio signal will be audible to the corresponding one or more participants when their corresponding entities are within a predetermined virtual space of the interactive environment.

5. The method of claim 2, wherein said setting step comprises setting the magnitude according to a distance in a virtual space of the interactive environment between the one or more entities corresponding to the output audio signal and the participant that originated the input audio signal.

6. The method of claim 1, wherein the points scored include credits earned in the interactive environment.

7. The method of claim 1, further comprising:
(d) delivering the output audio signal to a server for transmission to the corresponding one or more participants.

8. The method of claim 1, wherein the input audio signal is a speech signal.

9. The method of claim 1, wherein the interactive environment is an interactive gaming environment.

10. The method of claim 1, wherein step (a) comprises receiving the input audio signal from a server.

11. The method of claim 1, wherein step (b) comprises receiving the one or more instructions from a server.

12. The method of claim 1, wherein step (c) comprises combining the input audio signal with one or more other audio signals.

13. The method of claim 12, wherein said combining step comprises summing the input audio signal and the one or more other audio signals.

14. The method of claim 1, wherein step (c) comprises altering characteristics of the input audio signal.

15. The method of claim 14, wherein said altering step comprises adding one or more effects to the input audio signal.

16. The method of claim 14, wherein said altering step comprises performing character assimilation.

17. The method of claim 1, further comprising:
(d) monitoring the input audio signal for the presence of one or more predetermined words, the predetermined words to be included in the output audio signals.

18. The method of claim 17, further comprising:
(e) updating the interactive environment upon the recognition of the one or more predetermined words in step (d).

19. A system for providing enhanced audio communications in an interactive environment having a plurality of entities controlled by a plurality of participants, the system comprising:

(a) a server adapted to
(i) receive an input audio signal from one of the plurality of participants, and
(ii) send an output audio signal to one or more of the plurality of participants; and
(b) an audio bridge adapted to generate the output audio signal from the input audio signal wherein a magnitude of the output audio signal is at least in part based on points scored by the one of the plurality of participants in the interactive environment.

20. The system of claim 19, wherein the audio bridge is adapted to set a magnitude for the output audio signal.

21. The system of claim 20, wherein the audio bridge is further adapted to set the magnitude based on a location of the entity associated with the participant that originated the input audio signal within a virtual space of the interactive environment.

22. The system of claim 20, wherein the audio bridge is further adapted to set the magnitude so that the output audio signal will be audible to the corresponding one or more participants when their corresponding entities are within a predetermined virtual space of the interactive environment.

23. The system of claim 20, wherein the audio bridge is further adapted to set the magnitude according to a distance in a virtual space of the interactive environment between the entities associated with the one or more participants corresponding to the output audio signal and the participant that originated the input audio signal.

24. The system of claim 19, wherein said points scored include credits earned in the interactive environment.

25. The system of claim 19, further comprising a signal converter adapted to convert between a compressed audio signal format supported by the gaming server, and an uncompressed audio signal format supported by the audio bridge.

26. The system of claim 25, further comprising a local area network coupled to said gaming server, said signal converter, and said audio bridge.

27. The system of claim 19, wherein the input audio signal is a voice signal.

28. The system of claim 19, wherein the interactive environment is an interactive gaming environment.

29. The system of claim 19, wherein the audio bridge is further adapted to combine the input audio signal with one or more other audio signals.

30. The system of claim 19, wherein the audio bridge is further adapted to alter one or more characteristics of the input audio signal.

31. The system of claim 30, wherein the audio bridge is further adapted to alter one or more characteristics of the input audio signal to perform character assimilation.

32. The system of claim 19, wherein the audio bridge is adapted to monitor the input audio signal for the presence of one or more predetermined words.

33. The system of claim 32, wherein the server is adapted to update the interactive environment upon the recognition of the one or more predetermined words by the audio bridge.

* * * * *